(No Model.)  
2 Sheets—Sheet 1.

D. BEST.
GRAIN CLEANING APPARATUS.

No. 264,508. Patented Sept. 19, 1882.

Witnesses  
Geo. H. Strong  
Frank A. Brooks

Inventor  
Daniel Best  
By J. Dewey & Co. Attys

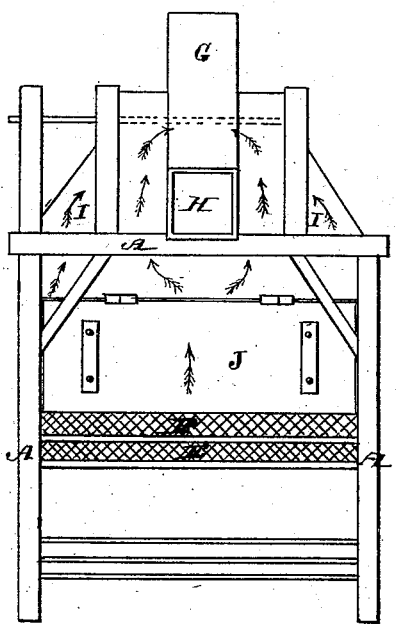

UNITED STATES PATENT OFFICE.

DANIEL BEST, OF ALBANY, OREGON.

GRAIN-CLEANING APPARATUS.

SPECIFICATION forming part of Letters Patent No. 264,508, dated September 19, 1882.

Application filed July 26, 1881. (No model.)

*To all whom it may concern:*

Be it known that I, DANIEL BEST, of Albany, Linn county, State of Oregon, have invented an Improved Grain-Cleaning Apparatus; and I do hereby declare the following to be a full, clear, and exact description thereof.

My invention relates to an improvement in grain-cleaning machines; and it consists in combining with a riddle and a blast-fan an auxiliary suction-fan in the top of the case, passages to such fan from the space above the riddle, and a hinged door for closing said chamber.

Figure 1:
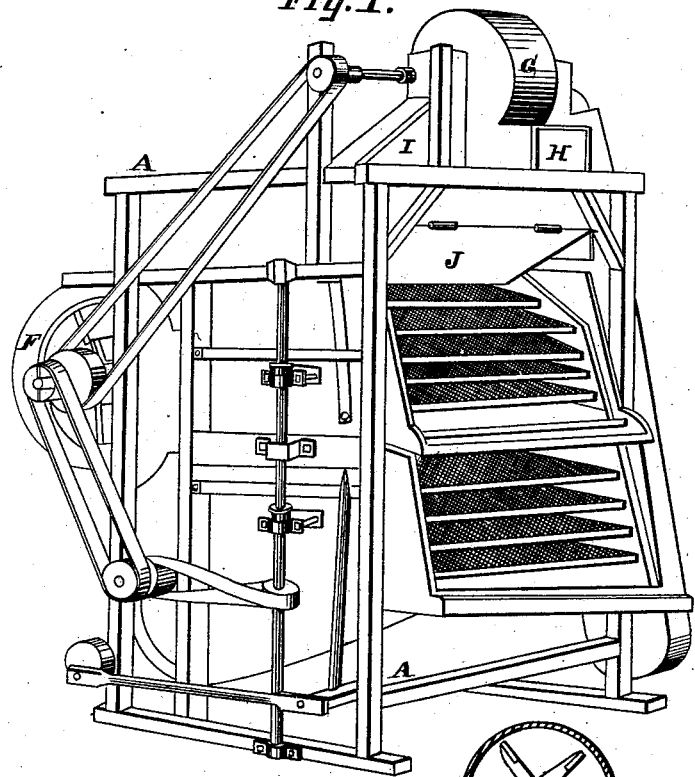
Figure 2:
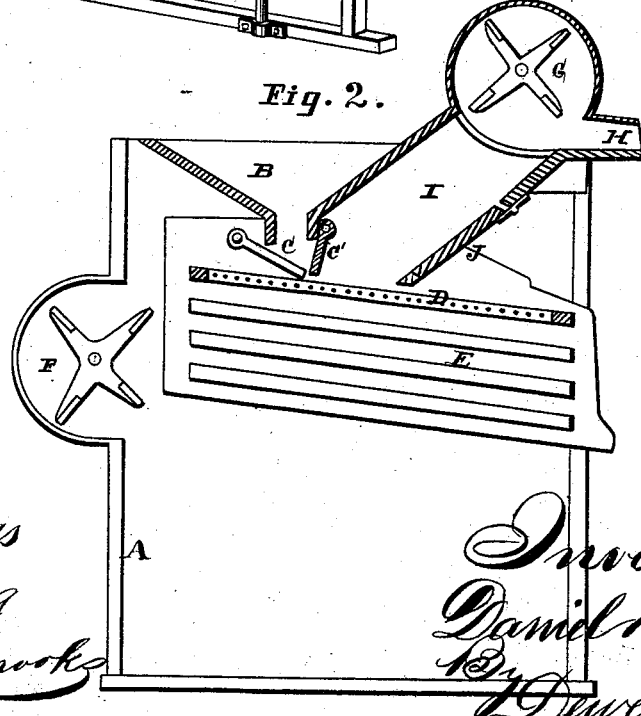

Referring to the accompanying drawings for a more complete explanation of my invention, Figure 1 is a perspective view of my apparatus. Fig. 2 is a vertical longitudinal section. Fig. 3 is a transverse section.

A is the frame of my separator, which supports the usual grain-hopper, B, grain-board C, with its regulator C', riddles D E, and the ordinary fan-blower, F.

Upon the top of the frame is the suction-fan G, having a discharge or escape pipe, H. Upon each side are the inlet-passages I, which open into the space above the upper riddle, D. A hinged door or gate, J, closes down to within about one-half an inch of the upper riddle, D, at a point eight or ten inches from the back end. This prevents the air from being drawn in from the end, and insures a strong draft through the riddle, thus taking off all the chaff and light material and discharging it through the escape-pipe. The remainder of the operation of cleaning the grain does not differ materially from that shown in my former application for a patent, filed May 16, 1881; but the work is rendered greatly superior by the use of the suction-fan.

Having thus described my invention, what I claim as new, and desire to secure by Letters Patent, is—

The combination, in a grain-separator having a riddle, D, and a main blast-fan, of a casing or chamber situated above the riddle D, and containing an auxiliary suction-fan, G, passages I I, connecting the said chamber with the space above the riddle, and a swinging door, J, and a discharge-spout.

In witness whereof I have hereunto set my hand.

DANIEL BEST.

Witnesses:
    E. E. PIERCE,
    M. S. MONTEITH.